United States Patent Office 3,413,233
Patented Nov. 26, 1968

3,413,233
OPTICAL BRIGHTENERS FOR SYNTHETIC
ORGANIC MATERIAL AND PROCESS
Adolf Emil Siegrist, Basel, Erwin Maeder, Aesch, Basel-Land, Leonardo Guglielmetti, Basel, and Peter Liechti, Binningen, Switzerland, assignors to Ciba Limited, Basel, Switzerland, a company of Switzerland
No Drawing. Filed Aug. 16, 1965, Ser. No. 480,169
Claims priority, application Switzerland, Aug. 20, 1964, 10,952/64
8 Claims. (Cl. 252—301.2)

It has been found that synthetic organic materials, especially synthetic organic fibrous materials, can be advantageously optically brightened with the use of stilbene derivatives which correspond to the general formula (1)
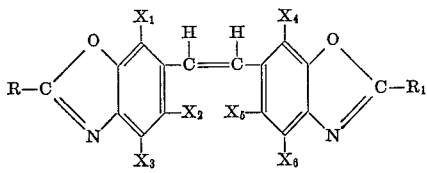

in which $X_1$ and $X_6$ are identical or different and each represents a hydrogen atom or a monovalent substituent, and R and $R_1$ are identical or different and each represents an aryl or aralkenyl radical or heterocyclic radical which contains at least two conjugated double bonds in conjugation with the $=C=N-$ double bond of the oxazole ring.

Suitable aryl radicals are, for example, those of the naphthalene series or especially those of the benzene series; preferred aralkenyl radicals are styryl residues whose benzene nucleus may be substituted, and heterocyclic radicals are primarily pyridine, furan and thiophene radicals. As mentioned above, each of the radicals R and $R_1$ in the Formula 1 should contain at least two conjugated double bonds which are in conjugation with the $=C=N-$ double bond of the oxazole ring.

Examples of suitable monovalent substituents $X_1$ to $X_6$ are the halogens, especially chlorine; furthermore hydroxyl, nitrile, alkyl, alkoxy, phenyl, sulfonic acid and carboxyl groups. $X_1$ to $X_6$ in the Formula 1 preferably represent a hydrogen atom each.

As examples of stilbene derivatives of the Formula 1 to be used in the present invention there may be specially mentioned those of the formula (2)
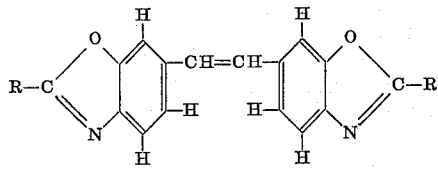

in which R represents a benzene radical.

The two benzene radicals R in the Formula 2 may be free from further substituents and each represents a phenyl group, but they may also contain one or several further identical or different substituents of non-chromophoric character and containing not more than 20 carbon atoms. Such substituents are for example other than nitro groups and may be for example halogen atoms such as fluorine or especially chlorine, nitrile or possibly acylated amino groups, linear or branched alkyl groups preferably containing at most 18 carbon atoms such as methyl, ethyl, isopropyl, n-butyl, tertiary butyl, 2-ethylhexyl, n-octyl, n-dodecyl or n-octadecyl, cycloalkyl groups, especially cyclohexyl, cyanoalkyl, hydroxyalkyl, halogenoalkyl, carboxylalkyl or carbalkoxyalkyl groups, aralkyl or aryl groups such as phenylalkyl or phenyl groups, alkenyl groups, hydroxyl, carboxyl, carbonamide or carboxylic acid ester (e.g. carboxylic acid alkyl, alkoxyalkyl, -alkenyl, -aryl or -aralkyl ester groups); furthermore sulfonic acid, sulfonic acid ester or sulfonamide groups and alkoxy, aryloxy, aralkoxy or acyloxy groups.

Particularly valuable compounds within the scope of this invention are symmetrical compounds of the general formula (2a)
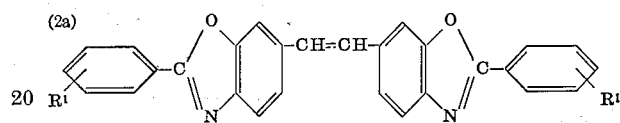

in which each $R^1$ represents an identical radical, preferably in para-position to the bond with the oxazole ring, from the series: Hydrogen atom, alkyl group containing 1 to 8 carbon atoms, halogen atom, phenyl group, carboxyl group, nitrile group, carboxylic acid alkyl ester group whose alkyl group contains up to 8 carbon atoms, and sulfonamide group.

The stilbene derivatives of the above composition to be used as optical brighteners for synthetic organic materials according to this invention can, as has been further found, be manufactured in a simple manner by heating a mixture of sulfur and a 6-methylbenzoxazole which is suitably substituted in the 2-position at a temperature above 250° C., preferably at about 270 to about 320° C., until the evolution of hydrogen sulfide ceases. The manufacture of stilbene derivatives of the Formula 2 by the process referred to above may be represented, for example, thus:

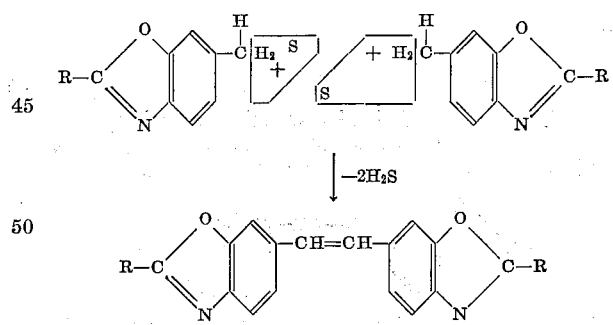

As examples of stilbene derivatives of the Formula 1 or 2 to be used in the present invention, manufactured by the process described above, the following may be listed:

(3)
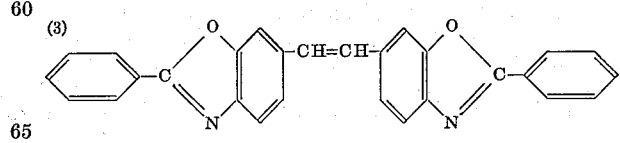

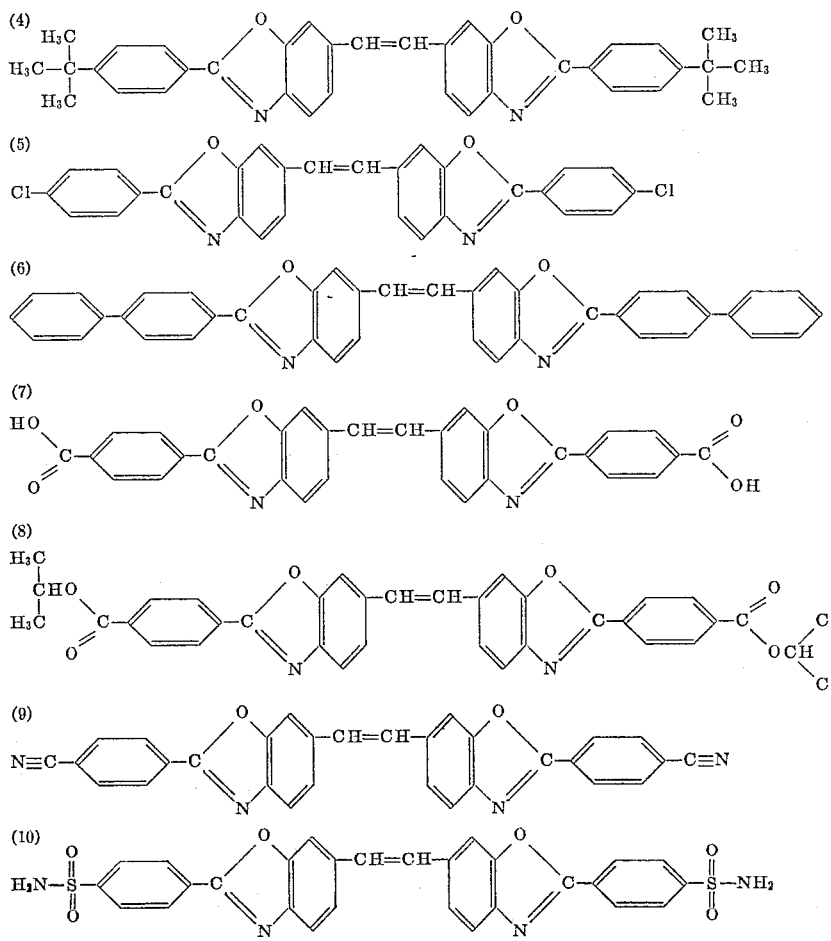

Two further processes, particularly suitable for the manufacture of symmetrical stilbene derivatives, consist substantially in condensing the stilbene compound of the formula

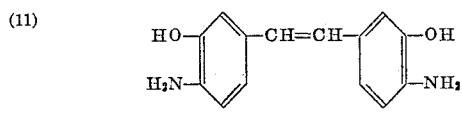

at a molecular ratio of 1s2, and if desired or required in the presence of a catalyst, with a monocarboxylic acid of the formula

or with a functional derivative, especially an acid chloride or alkylester of such said, at an elevated temperature; or in treating a dihydrostilbene of the formula

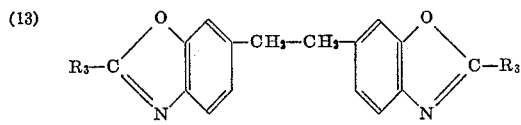

with a dehydrogenating agent e.g., with sulfur or with palladium and air.

If desired, further reactions may be performed with the stilbene derivatives described above. Thus, for example, water-soluble derivatives are obtained:

(a) By converting one or several primary or secondary amino groups of the stilbene derivatives of the Formula 1 or 2 with a sulfone, e.g. with propanesulfone or butanesulfone, at an elevated temperature into the corresponding alkylsufonic acid derivatives;

(b) By converting one of several primary amino groups of the stilbene derivatives of the Formula 1 or 2 with an aldehyde-bisulfite compound, e.g. with formaldehyde-alkali metal bisulfite, into the corresponding ω-methanesulfonic acid derivatives;

(c) By reacting one or several primary amino groups of the stilbene derivatives of the Formula 1 or 2 with an alkylsulfonic or aralkysulfonic acid e.g. bromothanesulfonic or benzylchloride-sulfonic acid;

(d) By coupling one or several primary or secondary amino groups or hydroxyl groups of the stilbene derivatives of the Formula 1 or 2 through s-triazine bridges with phenolsulfonic acids or anilinsulfonic acids;

(e) By introducing into one or several hydroxyl groups of the stilbene derivatives of the Formula 1 or 2 a polyalkylene ether chain sufficiently long to produce solubility in water by means of an alkylene oxide such as ethylene oxide or propylene oxide or by means of a polyalkylene ether monohalide;

(f) By reacting one or several groups, capable of undergoing quaternation, of the stilbene derivatives of the Formula 1 or 2 with a quaternating agent, e.g. methyl iodide, dimethyl sulfate, benzyl chloride or a toluenesulfonic acid alkyl ester, with heating, if desired or required under superatmospheric pressure;

(g) By introducing one or several halogenalkyl groups into the stilbene derivatives of the Formula 1, 2, 3, or 6 and converting them with a tertiary base, e.g. pyridine, into the corresponding quaternary derivatives.

When the stilbene derivatives are used according to this invention a very wide variety of synthetic organic materials can be optically brightened, and these materials may be in any desired state of processing and in any desired state of distribution. The stilbene derivative of the above composition may, for example, be added to or incorporated with the said materials before or during their shaping. Thus, for example, in the manufacture of films, foils, tapes or moulded articles it may be added to the moulding compositions or it may be dissolved or finely dispersed in the spinning mass prior to the spinning operation. Furthermore, the stilbene derivatives of the kind defined above may be added to the polymerization masses before or during the homopolymerization or copolymerization of monomers or to the reaction mixtures before or during the polycondensation.

The stilbene derivatives defined above are particularly suitable for optically brightening shaped structures from polymers based on monoolefins. In this context the term shaped structures includes both objects extending equally in three dimensions, such as blocks, mouldings and the like and predominantly two-dimensional materials such as coatings and films. However, they find their main use in the application to fibrous substrates from these materials in different stages of processing obtained by a variety of processing methods.

The polymers of monoolefins may be homopolymers or copolymers with one another or with other copolymerizable comonomers, e.g. vinyl esters (vinyl acetate, vinyl chloride), esters of acrylic acids (acrylic and methacrylic acid) and others. Of special industrial value are the homopolymers of α-monoolefins such as ethylene, propylene, and possibly isobutylene.

From among further synthetic organic materials suitable for the optical brightening operation of this invention there may be mentioned, for example, epoxy resins, alkyd resins and aldehyde resins such as formaldehyde condensation products with phenol, urea or aminotriazine, and above all materials capable of forming fibres, e.g. cellulose esters (such as cellulose triacetate, acetate rayon), polyesters, polyamides, polyurethanes, polyacrylonitrile, polystyrene, polyvinylchloride, polyvinylidenechloride, polyvinyl alcohol, polyvinyl acetate or other products accessible by polycondensation, homopolymerization, copolymerization or polyaddition.

The stilbene derivatives described above are advantageously used also for optically brightening synthetic organic fibrous materials from polyesters.

When fibres, which may be in the form of staple fibres or monofils, in the crude state, in the form of hanks, fibre fleeces or fabrics, are to be optically brightened by the present process, this is done, for example, in an aqueous medium in which the stilbene derivative chosen is suspended. The treatment may, if desired, be performed in the presence of so-called carriers and/or dispersants, e.g. soaps, polyglycol ethers of fatty alcohols, fatty amines or alkylphenols, cellulose sulfite waste liquor or formaldehyde condensates with possibly alkylated naphthalenesulfonic acids. It is particularly advantageous to work in a neutral, weakly alkaline or acid bath. Likewise, it is advantageous to perform the treatment at an elevated temperature ranging from about 50 to 100° C., for example at the boiling temperature of the bath or in its vicinity (at about 90° C.).

The optical brightening according to this invention may also be performed with a solution in an organic solvent.

When optically brightening fibrous substrates, especially (4)

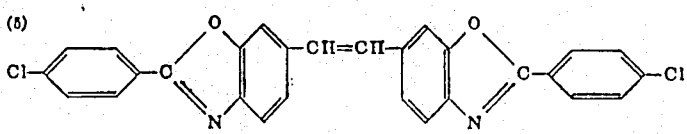

those based on monoolefin polymers or on polyesters, it is particularly advantageous to impregnate these fibres with an aqueous dispersion of the brightener at a temperature below 75° C., e.g. at room temperature (at about 20° C.) and then to subject them to a dry heat treatment at a temperature above 100° C., and in this case it is in general advisable first to dry the fibrous material at a moderately raised temperature of e.g. at least 60° C. to about 100° C. The heat treatment of the dry material is in this case advantageously performed at a temperature ranging from 120 to 225° C., for example by heating in a drying chamber, by ironing within the indicated temperature range or by treatment with dry superheated steam. The drying and the dry heat treatment may be performed one immediately after the other or they may be combined in a single operational step.

Furthermore, the compounds of the above Formula 1 may be fixed on a finely dispersed carrier material and used in this form. They may also be used as scintillators, for various photographic purposes such as electrophotographic reproduction or for supersensitizing.

The amount of stilbene derivative to be used in the present process, referred to the weight of the material to be optically brightened, may vary within wide limits. Even a very small amount, in certain cases e.g. as little as 0.01%, will produce a distinct and durable brightening effect, though an amount of up to 0.5% or even more may be used equally well.

Unless otherwise indicated, parts and percentages in the following manufacturing instructions and in the examples are by weight.

MANUFACTURING INSTRUCTIONS 10.5 parts of 2-phenyl-6-methylbenzoxazole of the formula (14)

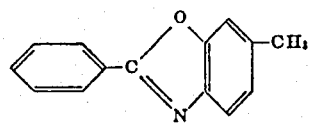

and 0.8 part of sulfur are fused together, and the melt is stirred for 30 to 45 minutes at 285° to 295° C. When the evolution of hydrogen sulfide has ceased, the melt is dissolved during its cooling in 50 parts by volume of tetrachloroethylene and then cooled to about 10° C., suction-filtered, washed with tetrachloroethylene and dried; to yield about 1.9 parts (=36.8% referred to the sulfur used) of the compound of the formula (3)

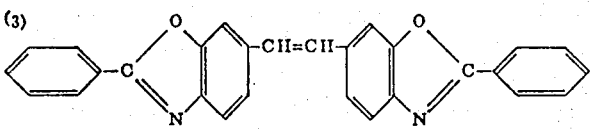

in the form of a yellowish brown crystalline powder which, after three recrystallizations from tetrachloroethylene with the aid of activated alumina, forms pale yellow needles melting at 272.5 to 273° C.

Analysis.—$C_{28}H_{18}O_2N_2$, calculated: C, 81.14; H, 4.38; N, 6.76%. Found: C, 80.72; H, 4.36; N, 6.73%. Molecular weight: 414.44.

The following bis-benzoxazole derivatives can be manufactured in a similar manner:

Pale yellow, very fine needles from tetrachloroethylene, melting at 293 to 293.5° C.

Analysis.—$C_{36}H_{34}O_2N_2$, calculated: C, 82.10; H, 6.51; N, 5.32%. Found: C, 82.16; H, 6.38; N, 5.45%. Molecular weight: 526.65.

(5)

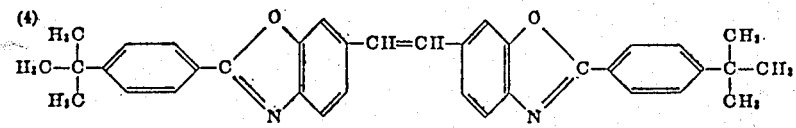

Light-yellow, finely crystalline powder from ortho-dichlorobenzene, melting above 350° C.

Analysis.—C$_{28}$H$_{16}$O$_2$N$_2$Cl$_2$, calculated: C, 69.58; H, 3.34; N, 5.80%. Found: C, 69.33; H, 3.45; N, 5.80%. Molecular weight: 483.35.

(6)

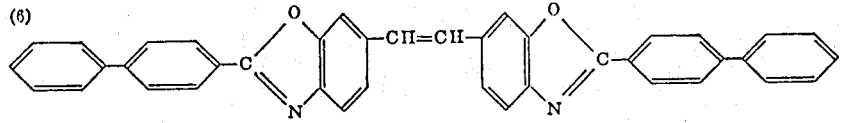

Light-yellow, finely crystalline powder from ortho-dichlorobenzene, melting at 334 to 334.5° C.

Analysis.—C$_{40}$H$_{26}$O$_2$N$_2$, calculated: C, 84.78; H, 4.63; N, 4.94%. Found: C, 84.83; H, 4.71; N, 4.90%. Molecular weight: 566.62.

EXAMPLE 1

A polyester fabric (e.g. "Dacron") is padded at room temperature (about 20° C.) with an aqueous dispersion containing, per litre, 2 g. of the compound of the Formula 3 or 4 and 1 g. of an adduct from about 8 mols of ethylene oxide with 1 mol of para-tertiary octylphenol, and then dried at about 100° C. The dry fabric is subjected to a heat treatment at 150 to 220° C. for 2 minutes to a few seconds, depending on the temperature used. The fabric treated in this manner has a much better white aspect than the untreated fabric.

EXAMPLE 2

100 parts of polyester granulate from polyterephthalic acid ethyleneglycol ester are intimately mixed with 0.05 part of a stilbene derivative of one of the Formulae 3 to 6 and fused with stirring at 285° C. When this spinning mass is spun through the usual spinnerets, it forms considerably brightened polyester fibres.

The compound of the Formula 3, 4, 5 or 6 may also be added to the starting materials before or during the polycondensation leading to the polyester.

EXAMPLE 3

100 parts of polyethylene are rolled to and fro on a calender heated at 130° C. to form a homogeneous foil, and 0.02 part of the compound of the Formula 3 and 0.5 part of titanium dioxide are slowly worked into this foil. When the optical brightener has dispersed evenly through the foil, it is pulled off the calender and then pressed on a press heated at 130 to 135° C. to form sheets.

The resulting sheets display a strong brightening effect.

EXAMPLE 4

Polypropylene fibres are treated at a goods-to-liquor ratio of 1:4 with 0.05% of the compound of the Formula 3 for 60 minutes at 60 to 100° C. in a bath which contains, per litre, 5 g. of an adduct from about 35 mols of ethylene oxide with 1 mol of octadecyl alcohol and 0.5 g. of trisodium phosphate. The material is then rinsed and dried. The polypropylene fibres obtained in this manner have a substantially higher white content than the untreated fibres.

When 1 g. of formic acid of 85% strength is used instead of 0.5 g. of trisodium phosphate, a similar effect is achieved.

EXAMPLE 5

Polypropylene powder is mixed with 0.02 to 0.05% of the optical brightener of the Formula 3 and spun in the usual manner through a spinning head at 270° C.

The resulting filament has a very good white content which possesses good fastness to light.

What is claimed is:
1. A process for the optical brightening of synthetic organic materials which comprises applying to said materials stilbene derivatives of the formula

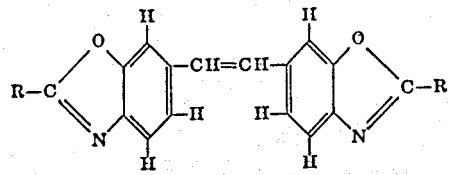

in which R represents a benzene residue which may contain further substituents having non-chromophoric character and containing at most 20 carbon atoms.

2. A process as claimed in claim 1, which comprises applying stilbene derivatives of the formula

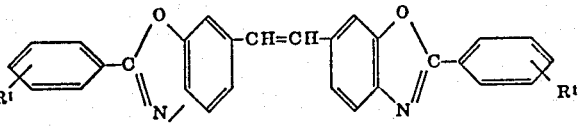

in which R$^1$ represents a member selected from the group consisting of a hydrogen atom, an alkyl group containing 1 to 8 carbon atoms, a halogen atom, a phenyl group, a carboxyl group, a nitrile group, a carboxylic acid alkyl ester group whose alkyl group contains up to 8 carbon atoms and a sulphonamide group.

3. A process for the optical brightening of polymers of α-monoolefines which comprises applying to said polymers stilbene derivatives of the formula

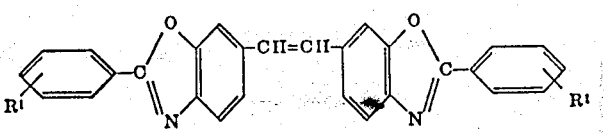

in which R$^1$ represents a member selected from the group consisting of a hydrogen atom, an alkyl group containing 1 to 8 carbon atoms, a halogen atom, a phenyl group, a carboxyl group, a nitrile group, a carboxylic acid alkyl ester group whose alkyl group contains up to 8 carbon atoms and a sulphonamide group.

4. A process for the optical brightening of polypropylene materials, which comprises applying to said materials the stilbene derivative of the formula

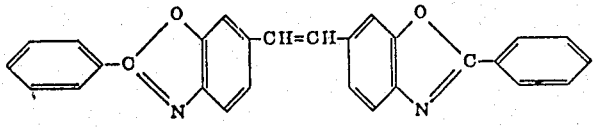

5. A process as claimed in claim 3 which comprises incorporating the stilbene derivatives as defined in claim 3 in polymers of α-monoolefines at any desired stage of preparation.

6. A process as claimed in claim 4, which comprises applying the stilbene derivative of the formula

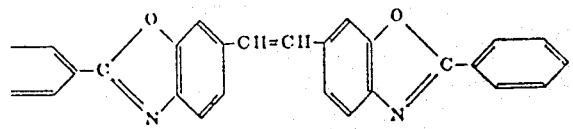

h fibrous substrates from polymers of propylene.

7. Synthetic organic material optically brightened by bene derivatives of the formula

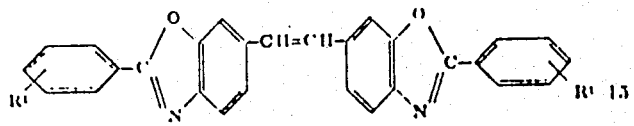

in which $R^1$ represents a member selected from the group consisting of a hydrogen atom, an alkyl group containing 1 to 8 carbon atoms, a halogen atom, a phenyl group, a carboxyl group, a nitrile group, a carboxylic acid alkyl ester group whose alkyl group contains up to 8 carbon atoms and a sulphonamide group.

8. A polymer of an α-monoolefine optically brightened by the stilbene derivative of the formula

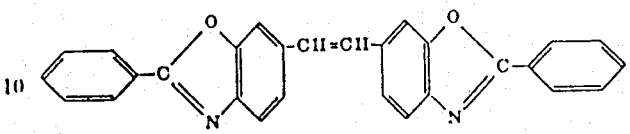

No references cited.

TOBIAS E. LEVOW, *Primary Examiner.*

J. COOPER, *Assistant Examiner.*